(12) United States Patent
Huang et al.

(10) Patent No.: US 12,212,221 B2
(45) Date of Patent: Jan. 28, 2025

(54) POWER ELECTRONIC TRANSFORMER AND POWER SUPPLY SYSTEM

(71) Applicant: Huawei Digital Power Technologies Co., Ltd., Guangdong (CN)

(72) Inventors: Zhuyong Huang, Dongguan (CN); Xiaofei Zhang, Dongguan (CN); Peng Shuai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 218 days.

(21) Appl. No.: 17/899,611

(22) Filed: Aug. 31, 2022

(65) Prior Publication Data

US 2022/0416671 A1 Dec. 29, 2022

Related U.S. Application Data

(63) Continuation of application No. PCT/CN2020/088429, filed on Apr. 30, 2020.

(51) Int. Cl.
*H02M 1/00* (2007.01)
*H02M 3/00* (2006.01)
(Continued)

(52) U.S. Cl.
CPC ......... *H02M 1/007* (2021.05); *H02M 1/0074* (2021.05); *H02M 3/01* (2021.05);
(Continued)

(58) Field of Classification Search
CPC .. H02M 1/0043; H02M 1/0058; H02M 1/007; H02M 1/0074; H02M 3/01; H02M 7/217; H02M 7/219; H02M 7/23
See application file for complete search history.

(56) References Cited

U.S. PATENT DOCUMENTS

| 9,112,422 B1 | 8/2015 | Vinciarelli |
| 9,407,154 B2 | 8/2016 | Freeman et al. |

(Continued)

FOREIGN PATENT DOCUMENTS

| CN | 101795081 A | 8/2010 |
| CN | 105932885 A | 9/2016 |

(Continued)

OTHER PUBLICATIONS

Nakakohara et al., "Three-Phase LLC Series Resonant DC/DC Converter Using SiC MOSFETs to Realize High-Voltage and High-Frequency Operation," in IEEE Transactions on Industrial Electronics, vol. 63, No. 4, pp. 2103-2110, Apr. 2016, doi: 10.1109/TIE.2015.2499721. (Year: 2016).*

(Continued)

*Primary Examiner* — Fred E Finch, III

(57) ABSTRACT

This application discloses a power electronic transformer wherein each phase includes a plurality of power conversion modules. Each power conversion module includes a rectifier AC/DC circuit, a direct current bus capacitor, and a direct current-direct current DC/DC circuit. In each power conversion module, an output end of the AC/DC circuit is connected to an input end of the DC/DC circuit; the direct current bus capacitor is connected in parallel to the output end of the AC/DC circuit; and input ends of all the AC/DC circuits are connected in series, and output ends of all the DC/DC circuits are connected in parallel. The power electronic transformer includes a relatively small quantity of power conversion modules, thereby reducing occupied space and costs.

18 Claims, 10 Drawing Sheets

(51) Int. Cl.
*H02M 7/217* (2006.01)
*H02M 7/23* (2006.01)

(52) U.S. Cl.
CPC ............. *H02M 7/217* (2013.01); *H02M 7/23* (2013.01); *H02M 1/0043* (2021.05); *H02M 1/0058* (2021.05)

(56) References Cited

U.S. PATENT DOCUMENTS

| | | | | |
|---|---|---|---|---|
| 2005/0185429 | A1* | 8/2005 | Vinciarelli | H02M 3/1584 363/65 |
| 2010/0314937 | A1* | 12/2010 | Jacobson | H02M 3/28 307/18 |
| 2012/0007431 | A1* | 1/2012 | Jang | H02J 4/00 307/82 |
| 2016/0065081 | A1* | 3/2016 | Raju | H02M 3/33571 29/602.1 |
| 2018/0091037 | A1* | 3/2018 | Zhao | H02M 7/5387 |
| 2018/0191252 | A1 | 7/2018 | Bianco et al. | |
| 2018/0337607 | A1 | 11/2018 | Drda et al. | |
| 2019/0013741 | A1* | 1/2019 | Zhang | H02M 3/33571 |
| 2020/0006970 | A1 | 1/2020 | Chen et al. | |
| 2020/0328696 | A1* | 10/2020 | Dehem | H02M 3/33571 |

FOREIGN PATENT DOCUMENTS

| | | |
|---|---|---|
| CN | 107086806 A | 8/2017 |
| CN | 208353221 U | 1/2019 |
| CN | 109687730 A | 4/2019 |
| CN | 109768706 A | 5/2019 |
| CN | 110661433 A | 1/2020 |
| WO | 2015199718 A1 | 12/2015 |

OTHER PUBLICATIONS

Lai et al., "A modular front-end medium-voltage solid-state transformer," 2017 Asian Conference on Energy, Power and Transportation Electrification (ACEPT), Singapore, 2017, pp. 1-6, doi: 10.1109/ACEPT.2017.8168621. (Year: 2017).*

Chen et al., "A Natural Bidirectional Input-Series-Output-Parallel LLC-DCX Converter [ . . . ]," in IEEE J-ESTPE, vol. 8, No. 4, pp. 3618-3632, Dec. 2020. Orig. pub. Sep. 16, 2019, doi: 10.1109/JESTPE.2019.2941583. (Year: 2019).*

* cited by examiner

POWER ELECTRONIC TRANSFORMER AND POWER SUPPLY SYSTEM

CROSS-REFERENCE TO RELATED APPLICATIONS

This application is a continuation of International Application No. PCT/CN2020/088429, filed on Apr. 30, 2020, the disclosure of which is hereby incorporated by reference in its entirety.

TECHNICAL FIELD

This application relates to the field of power system technologies, and in particular, to a power electronic transformer and a power supply system.

BACKGROUND

In a power system, a transformer usually serves to perform voltage transformation, for example, transform a high voltage to a low voltage or transform a low voltage to a high voltage. Currently, an alternating current output by a power plant first undergoes voltage boosting by a transformer and is then transmitted to a power grid. However, on a user side, a transformer is needed to reduce, to a low voltage, a high voltage transmitted from the power grid, for use on the user side. However, a conventional transformer is in a form of a magnetic core and a coil. A transformer in this form is relatively cumbersome. Therefore, with development of semiconductor technologies, a power electronic transformer has emerged at present.

A power electronic transformer flexibly controls an output voltage by controlling a switching status of a semiconductor component, thereby converting an alternating current with a relatively high voltage into an alternating current or a direct current with a relatively low voltage. A switching frequency of the semiconductor component is higher than a utility frequency. Therefore, the power electronic transformer can also be understood as a high-frequency transformer that replaces a conventional utility frequency transformer.

A power electronic transformer generally internally includes a plurality of power conversion modules. For example, an input of the power electronic transformer is an alternating current, and an output is a direct current. Refer to FIG. 1. A three-phase alternating current power source is used as an example. The three-phase alternating current power source includes an A phase, a B phase, and a C phase. The A phase is used as an example, which includes a plurality of power conversion modules 100. Each power conversion module 100 includes a rectifier AC/DC circuit for rectification and a direct current-direct current DC/DC circuit. In each power conversion module 100, an output end of the AC/DC circuit is connected to an input end of the DC/DC circuit. A voltage at an input end of the power electronic transformer is relatively high. Therefore, the input ends of the AC/DC circuits in all the power conversion modules 100 are connected in series, but the output ends of all the DC/DC circuits are connected in parallel.

The following describes a structure of a power conversion module with reference to FIG. 2.

Switching semiconductor components Q1 to Q4 form a full-bridge AC/DC circuit. Capacitors C1 to C3 are direct current bus capacitors connected in series. Switching semiconductor components Q5 to Q12, an inductor L1, and a transformer T1 form a DC/DC circuit.

Currently, a voltage of an alternating current power source is relatively high, but rated voltages of the switching semiconductor components (Q5 to Q12) in the DC/DC circuit that are switch on/off at a high frequency are limited. Therefore, each phase of the power electronic transformer needs a large quantity of power conversion modules.

However, an excessive quantity of power conversion modules results in an excessively complex overall design of a power electronic transformer, and accordingly, there is an excessive quantity of matching circuit boards. This increases both occupied space and costs.

SUMMARY

This application provides a power electronic transformer and a power supply system, to decrease a quantity of power conversion modules, thereby reducing occupied space and costs of the entire power electronic transformer.

According to a first aspect, an embodiment of this application provides a power electronic transformer. The power electronic transformer is a single-phase power electronic transformer or a three-phase power electronic transformer. A quantity of phases of the power electronic transformer may be determined based on an application scenario. For example, when an input power source is a three-phase alternating current power source, a three-phase power electronic transformer is needed. When an input power source is a single-phase alternating current power source, a single-phase power electronic transformer is needed. Each phase includes a plurality of power conversion modules. Each power conversion module includes a rectifier AC/DC circuit, a direct current bus capacitor, and a direct current-direct current DC/DC circuit; in each power conversion module, an output end of the AC/DC circuit is connected to an input end of the DC/DC circuit; the direct current bus capacitor is connected in parallel to the output end of the AC/DC circuit; and input ends of all the AC/DC circuits are connected in series, and output ends of all the DC/DC circuits are connected in parallel. Each DC/DC circuit includes n LLC resonant DC/DC units, where input ends of the n LLC resonant DC/DC units are connected in series and then connected to the output end of the corresponding AC/DC circuit, output ends of the n LLC resonant DC/DC units are connected in parallel and serve as an output end of the DC/DC circuit, and n is an integer greater than or equal to 2.

Each phase of the power electronic transformer includes a plurality of power conversion modules. The DC/DC circuit in each power conversion module includes a plurality of LLC resonant DC/DC units. An input end of each LLC resonant DC/DC unit includes at least two switching transistors that are connected in series, and the input ends of all the LLC resonant DC/DC units are connected in series to two ends of the direct current bus capacitor. Therefore, the two ends of the direct current bus capacitor are connected in parallel to at least 2n switching transistors. A voltage that a single power conversion module can withstand increases as a quantity of switching transistors increases. When an input voltage of the power electronic transformer is definite, fewer power conversion modules are needed. Therefore, the power electronic transformer can decrease a quantity of internal power conversion modules, thereby reducing design complexity of the entire power electronic transformer, reducing occupied space, and reducing costs.

Each power conversion module includes n direct current bus capacitors. All the direct current bus capacitors are connected in series and then connected in parallel between a direct current positive bus and a direct current negative bus of the output end of the AC/DC circuit. In other words, a quantity of direct current bus capacitors is equal to a quantity of LLC resonant DC/DC units, and each LLC resonant DC/DC unit corresponds to one direct current bus capacitor. A positive input end and a negative output end of each LLC resonant DC/DC unit are respectively connected to two ends of the corresponding direct current bus capacitor. The direct current bus capacitors serve to perform filtering and energy storage.

Preferably, each LLC resonant DC/DC unit includes a first switching transistor, a second switching transistor, a capacitor, an inductor, a transformer, a first diode, and a second diode. The first switching transistor and the second switching transistor are connected in series and then connected to two ends of the corresponding direct current bus capacitor. A common end of the first switching transistor and the second switching transistor is connected to a negative electrode of the corresponding direct current bus capacitor through the capacitor, the inductor, and a primary side of the transformer that are connected in series. An anode of the first diode is connected to a positive electrode of a secondary side of the transformer, and a cathode of the first diode is connected to a positive output end of the corresponding DC/DC circuit. A cathode of the second diode is connected to the positive electrode of the secondary side of the transformer, and an anode of the second diode is connected to a negative output end of the corresponding DC/DC circuit.

The first switching transistor and the second switching transistor are connected in series and then connected to the two ends of the corresponding direct current bus capacitor. Therefore, more switching transistors are connected in series to the output end of the AC/DC circuit as the quantity of LLC resonant DC/DC units increases, and a higher voltage is divided, thereby decreasing an overall quantity of power conversion modules.

Preferably, in each LLC resonant DC/DC unit, a first driving pulse signal of the first switching transistor and a second driving pulse signal of the second switching transistor are complementary to each other, and the first driving pulse signal and the second driving pulse signal have a same cycle and both have a duty cycle of 50%.

Preferably, phases of driving pulse signals corresponding to the LLC resonant DC/DC units are offset by T/n in sequence, where T represents a cycle of the driving pulse signals. A phase offset of the driving pulse signals serves to reduce current ripples and improve quality of an output current.

Preferably, n is greater than or equal to 3; and the negative electrodes of the secondary sides of the transformers in the LLC resonant DC/DC units are connected together. A smaller quantity of power conversion modules are used in the power electronic transformer as a quantity of LLC resonant DC/DC units increases, leading to a smaller volume of the entire power electronic transformer and lower costs.

Preferably, the quantity n of LLC resonant DC/DC units is greater than or equal to 3
. In this case, a voltage and a current output by the power electronic transformer have better quality. Fewer harmonic waves are included, and a ripple current is lower. In addition, due to existence of LLC resonance, the switching transistors in the LLC resonant DC/DC units can approximately implement soft switching, thereby reducing switching losses.

Preferably, n is an integer multiple of 3. Every three LLC resonant DC/DC units are one group, and negative electrodes of secondary sides of transformers in the three LLC resonant DC/DC units in each group are connected together. When the quantity of LLC resonant DC/DC units is an integer multiple of 3, every three LLC resonant DC/DC units may be classified into one group, with the negative electrodes of the secondary sides connected together. This facilitates cable layout and can reduce interference to signals.

Preferably, when n is 3, each DC/DC circuit includes the following three LLC resonant DC/DC units: a first LLC resonant DC/DC unit, a second LLC resonant DC/DC unit, and a third LLC resonant DC/DC unit; and the direct current bus capacitor includes a first direct current bus capacitor, a second direct current bus capacitor, and a third direct current bus capacitor. An input end of the first LLC resonant DC/DC unit is connected to two ends of the first direct current bus capacitor, an input end of the second LLC resonant DC/DC unit is connected to two ends of the second direct current bus capacitor, and an input end of the third LLC resonant DC/DC unit is connected to two ends of the third direct current bus capacitor. Negative electrodes of secondary sides of transformers in the first LLC resonant DC/DC unit, the second LLC resonant DC/DC unit, and the third LLC resonant DC/DC unit are connected together; and output ends of the first LLC resonant DC/DC unit, the second LLC resonant DC/DC unit, and the third LLC resonant DC/DC unit are connected in parallel.

The three LLC resonant DC/DC units have a same structure. Therefore, phases of primary-side currents of the three transformers may also be offset by T/3. Parameters of the transformers are the same. Therefore, phases of secondary-side currents of the three transformers are also offset by T/3. When there is a load at an output end of the power electronic transformer, a positive current and a negative current exist at the same time in the secondary-side currents of the three transformers at any moment. Therefore, the negative electrodes of the secondary sides of the three transformers can be connected together.

The negative electrodes of the secondary sides of the transformers are connected together. This is favorable for diodes connected to the secondary sides to implement soft switching, thereby reducing switching losses.

Preferably, when n is 6, each DC/DC circuit includes the following six LLC resonant DC/DC units: a first LLC resonant DC/DC unit, a second LLC resonant DC/DC unit, a third LLC resonant DC/DC unit, a fourth LLC resonant DC/DC unit, a fifth LLC resonant DC/DC unit, and a sixth LLC resonant DC/DC unit; and the direct current bus capacitor includes a first direct current bus capacitor, a second direct current bus capacitor, a third direct current bus capacitor, a fourth direct current bus capacitor, a fifth direct current bus capacitor, and a sixth direct current bus capacitor. An input end of the first LLC resonant DC/DC unit is connected to two ends of the first direct current bus capacitor, an input end of the second LLC resonant DC/DC unit is connected to two ends of the second direct current bus capacitor, an input end of the third LLC resonant DC/DC unit is connected to two ends of the third direct current bus capacitor, an input end of the fourth LLC resonant DC/DC unit is connected to two ends of the fourth direct current bus capacitor, an input end of the fifth LLC resonant DC/DC unit is connected to two ends of the fifth direct current bus capacitor, and an input end of the sixth LLC resonant DC/DC unit is connected to two ends of the sixth direct current bus capacitor. Negative electrodes of secondary sides of transformers in the first LLC resonant DC/DC unit, the second LLC resonant DC/DC unit, and the third LLC resonant DC/DC unit are connected together; and negative electrodes of secondary sides of transformers in the fourth LLC resonant DC/DC unit, the fifth LLC resonant DC/DC unit, and the sixth LLC resonant DC/DC unit are connected together. Output ends of the first LLC resonant DC/DC unit, the second LLC resonant DC/DC unit, the third LLC resonant DC/DC unit, the fourth LLC resonant DC/DC unit, the fifth LLC resonant DC/DC unit, and the sixth LLC resonant DC/DC unit are connected in parallel.

Each power conversion module includes six LLC resonant DC/DC units. Compared to when the power conversion module includes three or two LLC resonant DC/DC units, this can further enhance a voltage withstanding capability, thereby decreasing a quantity of power conversion modules in the entire power electronic transformer and further reducing an overall volume of the power electronic transformer.

Preferably, the n direct current bus capacitors have a same capacitance, and the power electronic transformer further includes a voltage sampling circuit and a controller. The voltage sampling circuit is configured to collect a voltage on each direct current bus capacitor. The controller is configured to: compare the voltage on each direct current bus capacitor with a preset voltage; and when a voltage on an $i^{th}$ direct current bus capacitor is greater than the preset voltage, control a switching frequency of a switching transistor in an LLC resonant DC/DC unit corresponding to the $i^{th}$ direct current bus capacitor to decrease, so as to decrease the voltage on the $i^{th}$ direct current bus capacitor; or when a voltage on an $i^{th}$ direct current bus capacitor is less than the preset voltage, control a switching frequency of a switching transistor in an LLC resonant DC/DC unit corresponding to the $i^{th}$ direct current bus capacitor to increase, so as to increase the voltage on the $i^{th}$ direct current bus capacitor, where i=1, . . . , and n.

The voltage sampling circuit collects the voltages on all the direct current bus capacitors, and the controller compares the voltage on each direct current bus capacitor with the preset voltage. When a voltage on a direct current bus capacitor is not equal to the preset voltage, the controller controls a switching frequency of a switching transistor in an LLC resonant DC/DC unit corresponding to the direct current bus capacitor to change, to adjust the voltage on the direct current bus capacitor. In this way, a problem that voltages on the direct current bus capacitors are unbalanced caused by a component difference between the direct current bus capacitors can also be overcome without a need to set a balanced circuit for the direct current bus capacitors, thereby implementing automatic voltage balancing for the direct current bus capacitors, and further reducing occupied space and costs of a single power electronic transformer.

Preferably, each phase further includes a filter inductor, where the filter inductor is connected in series between an alternating current power source and a power conversion module that is directly connected to the alternating current power source. The filter inductor can filter out high-order harmonic waves.

Preferably, the power electronic transformer further includes a filter capacitor, where each group corresponds to one filter capacitor, and the filter capacitor is connected in parallel to an output end of the group. The filter capacitor can filter out interfering signals, thereby improving quality of a voltage and a current that are output to a load.

Preferably, the AC/DC circuit is any one of the following: a two-level full-bridge rectifier, an I-type three-level rectifier, and a T-type three-level rectifier. In this embodiment of this application, an implementation form of the AC/DC circuit is not limited.

An embodiment of this application further provides a power supply system, including an alternating current power source and the power electronic transformer described above. An input end of the power electronic transformer is connected to the alternating current power source, and the power electronic transformer is configured to transform and then output a voltage of the alternating current power source.

An input end of each LLC resonant DC/DC unit includes at least two switching transistors that are connected in series, and the input ends of all the LLC resonant DC/DC units are connected in series to two ends of a direct current bus capacitor. Therefore, the two ends of the direct current bus capacitor are connected in parallel to at least 2n switching transistors. A voltage that a single power conversion module can withstand increases as a quantity of switching transistors increases. When an input voltage of the power electronic transformer is definite, fewer power conversion modules are needed. Therefore, the power electronic transformer in the power supply system can decrease a quantity of internal power conversion modules, thereby reducing design complexity of the power electronic transformer in the power supply system, reducing occupied space, and reducing costs.

The alternating current power source is a single-phase power source or a three-phase power source. When the alternating current power source is a single-phase power source, the power electronic transformer is a single-phase power electronic transformer. When the alternating current power source is a three-phase power source, the power electronic transformer is a three-phase power electronic transformer.

It can be learned from the foregoing technical solutions that the embodiments of this application have the following advantages:

The power electronic transformer provided in the embodiments of this application may be a single-phase power electronic transformer or may be a three-phase power electronic transformer. Each phase includes a plurality of power conversion modules. Each power conversion module includes a rectifier AC/DC circuit, a direct current bus capacitor, and a direct current-direct current DC/DC circuit; in each power conversion module, the output end of the AC/DC circuit is connected to the input end of the DC/DC circuit; the direct current bus capacitor is connected in parallel to the output end of the AC/DC circuit; and the input ends of all the AC/DC circuits are connected in series, and the output ends of all the DC/DC circuits are connected in parallel. Each DC/DC circuit includes n LLC resonant DC/DC units, where the input ends of the n LLC resonant DC/DC units are connected in series and then connected to the output end of the corresponding AC/DC circuit, the output ends of the n LLC resonant DC/DC units are connected in parallel and serve as the output end of the DC/DC circuit, and n is an integer greater than or equal to 2.

By using the foregoing power electronic transformer, because of a topological structure in which a DC/DC circuit in a power conversion module in the power electronic transformer includes at least two LLC resonant DC/DC units, and because the input end of each LLC resonant DC/DC unit includes at least two switching transistors that are connected in series and the input ends of all the LLC resonant DC/DC units are connected in series to the two ends of the direct current bus capacitor, the two ends of the direct current bus capacitor are connected in parallel to at least 2n switching transistors. A voltage that a single power conversion module can withstand increases as a quantity of switching transistors increases. When an input voltage of the power electronic transformer is definite, fewer power conversion modules are needed. Therefore, the power electronic transformer can decrease a quantity of internal power conversion modules, thereby reducing design complexity of the entire power electronic transformer, reducing occupied space, and reducing costs.

DESCRIPTION OF EMBODIMENTS

To make a person skilled in the art better understand technical solutions provided in embodiments of this application, the following clearly and completely describes the technical solutions in the embodiments of this application with reference to accompanying drawings in the embodiments of this application.

Figure 1:
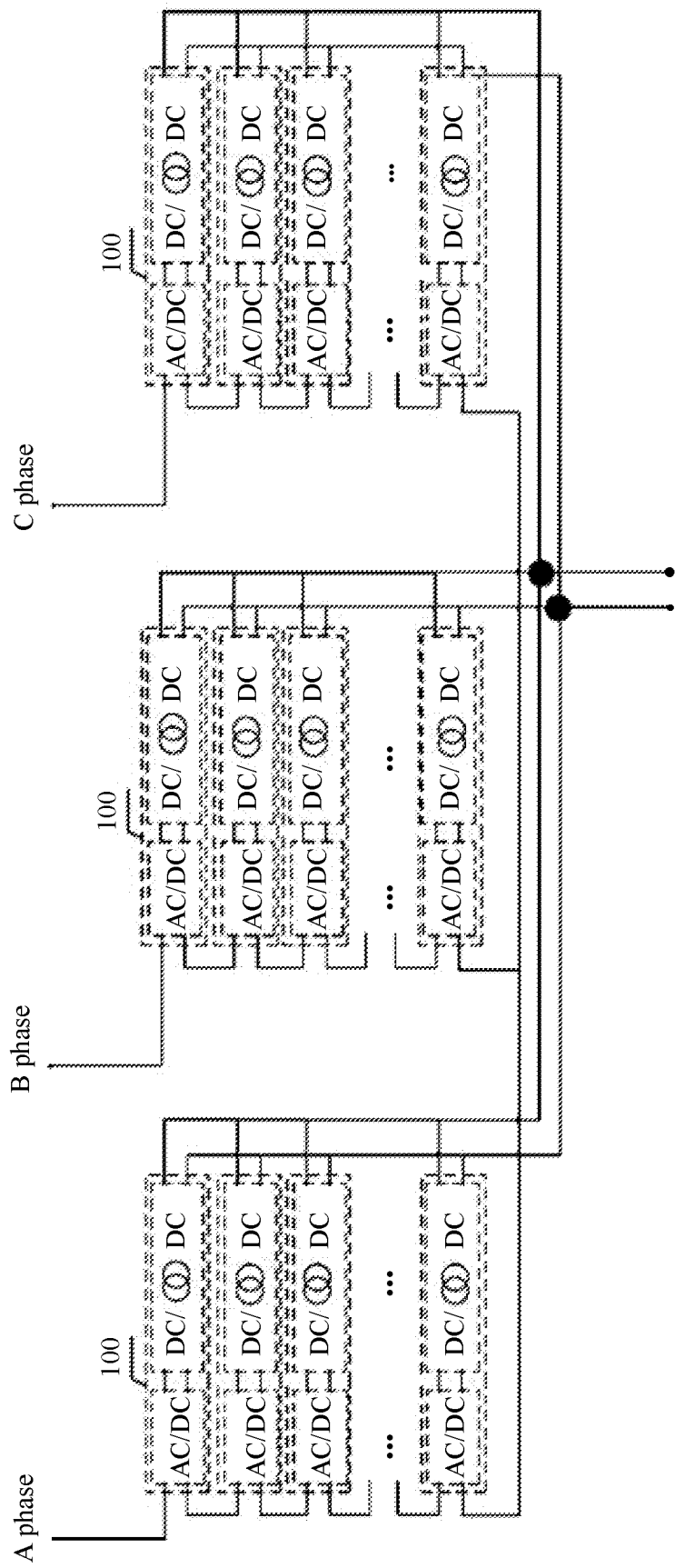
FIG. 1 is a diagram of a power electronic transformer.
Figure 2:
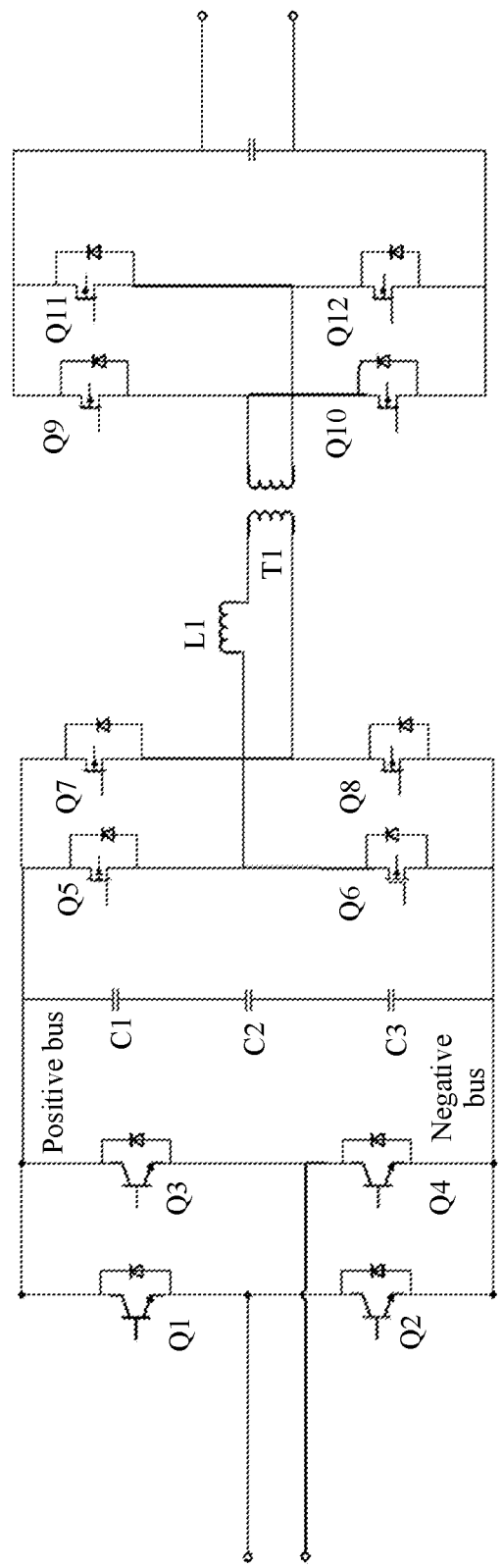
FIG. 2 is a circuit diagram of a power conversion module.

In FIG. 2, only two semiconductor switching components Q5 and Q6 that are connected in series are included between a positive bus and a negative bus of a DC/DC circuit. Q5 and Q6 are connected in series and perform voltage division for a direct current bus voltage (which is a voltage obtained by connecting C1, C2, and C3 in series). If Q5 and Q6 are both switching transistors with a withstand voltage of 650 V, a direct current bus voltage that Q5 and Q6 can withstand is approximately 400 V. For an input alternating current of 10 kV, each phase of alternating current in a power electronic transformer needs approximately 25 power conversion modules like the one shown in FIG. 2. Therefore, it can be learned that a power electronic transformer for a three-phase alternating current power source internally includes approximately 25*3=75 power conversion modules. An excessive quantity of power conversion modules results in an excessively complex design, a relatively large volume, relatively large occupied space, and relatively high costs of the entire power electronic transformer.

Embodiment 1 of Power Electronic Transformer

To resolve the foregoing technical problem, this embodiment of this application provides a power electronic transformer. The power electronic transformer may be a single-phase power electronic transformer, or may be a three-phase power electronic transformer. A quantity of phases of the power electronic transformer may be determined based on an application scenario.

For example, when an input power source is a three-phase alternating current power source, a three-phase power electronic transformer is needed. When an input power source is a single-phase alternating current power source, a single-phase power electronic transformer is needed.

Each phase of the power electronic transformer includes a plurality of power conversion modules. A DC/DC circuit in each power conversion module includes a plurality of LLC resonant DC/DC units, which can improve a withstand voltage of the power conversion module. When a voltage of an alternating current at an input end is definite, a total quantity of power conversion modules can be decreased, thereby reducing occupied space and costs of the entire power electronic transformer.

The following describes this embodiment provided in this application in detail with reference to accompanying drawings.

Figure 3:
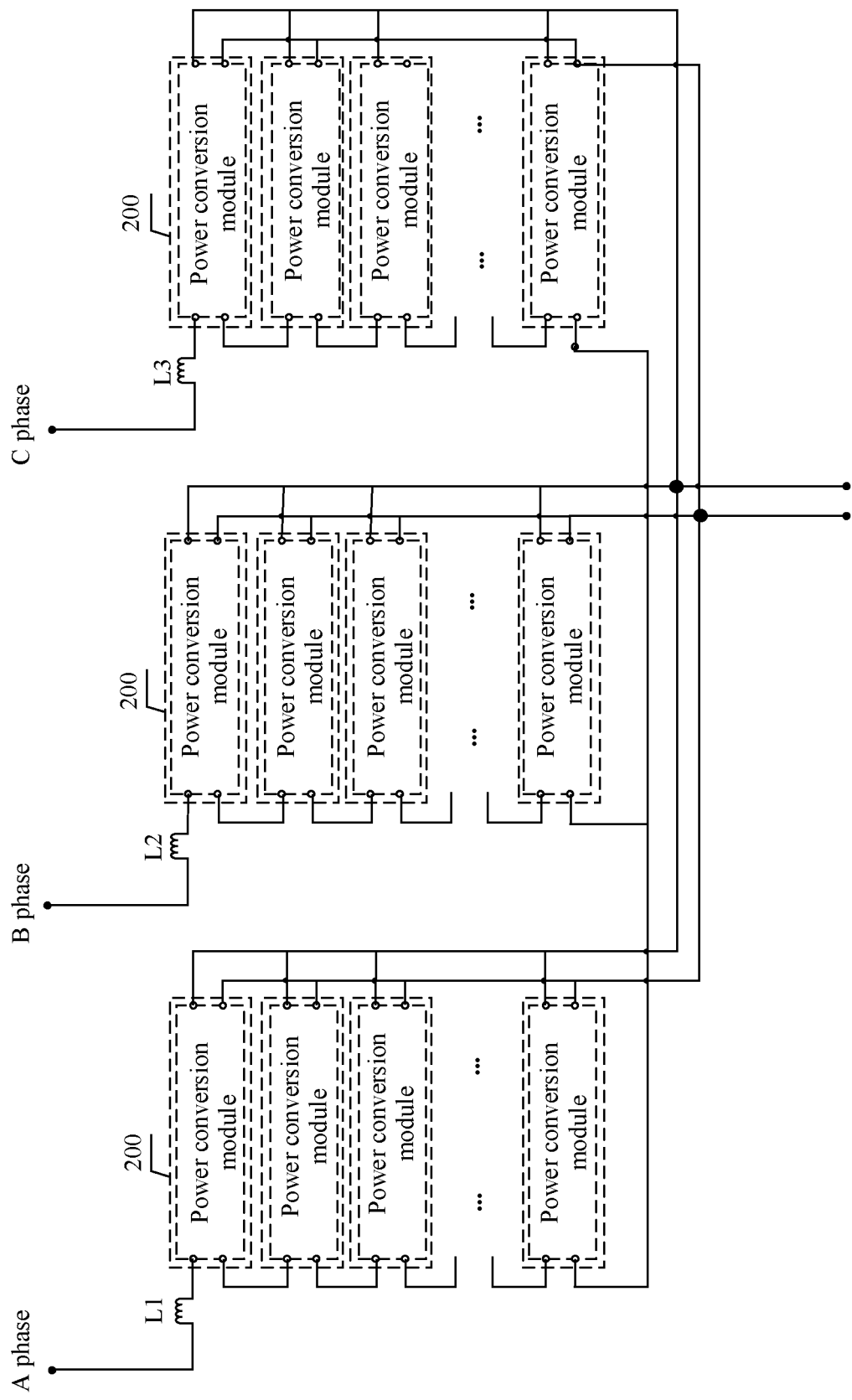
FIG. 3 is a diagram of a power electronic transformer according to an embodiment of this application.

FIG. 3 is a diagram of the power electronic transformer provided in this embodiment of this application.

Using a three-phase power electronic transformer as an example, each phase includes a plurality of power conversion modules 200; each power conversion module includes a rectifier AC/DC circuit, a direct current bus capacitor, and a direct current-direct current DC/DC circuit; in each power conversion module, an output end of the AC/DC circuit is connected to an input end of the DC/DC circuit; the direct current bus capacitor is connected in parallel to the output end of the AC/DC circuit; and input ends of all the AC/DC circuits are connected in series, and output ends of all the DC/DC circuits are connected in parallel.

An input voltage is relatively high. Therefore, each phase of the power electronic transformer needs to include a plurality of power conversion modules. Input ends of the plurality of power conversion modules are connected in series to implement voltage division for the input voltage, so that a voltage that each power conversion module withstands is within an allowed range of the power conversion module, thereby preventing an internal switching transistor of the power conversion module from being damaged.

In the power conversion modules 200, each DC/DC circuit includes n LLC resonant DC/DC units, where input ends of the n LLC resonant DC/DC units are connected in series and then connected to the output end of the corresponding AC/DC circuit, output ends of the n LLC resonant DC/DC units are connected in parallel and serve as an output end of the DC/DC circuit, and n is an integer greater than or equal to 2. A value of n is not limited in this embodiment. A person skilled in the art can select a value of n based on an actual need. As a quantity of LLC resonant DC/DC units included in each power conversion module increases, a voltage that a single power conversion module can withstand increases, and when a voltage of an alternating current power source is definite, there is a smaller quantity of internal power conversion modules in the power electronic transformer. For example, n may be any integer from 2 to 12, or an integer greater than 12 may be selected.

In an implementation, the power electronic transformer further includes a filter inductor. The filter inductor is connected in series between the alternating current power source and a power conversion module that is directly connected to the alternating current power source. As shown in FIG. 3, an A phase includes a filter inductor L1, a B phase includes a filter inductor L2, and a C phase includes a filter inductor L3. The filter inductor serves to filter out harmonic signals.

All the power conversion modules in the power electronic transformer have a same internal structure. Therefore, for ease of description, the following describes an internal structure of a single power conversion module with reference to accompanying drawings. For ease of description and ease of understanding by a person skilled in the art, the following provides description by using an example in which the DC/DC circuit includes two LLC resonant DC/DC units, that is, n=2.

Figure 4:
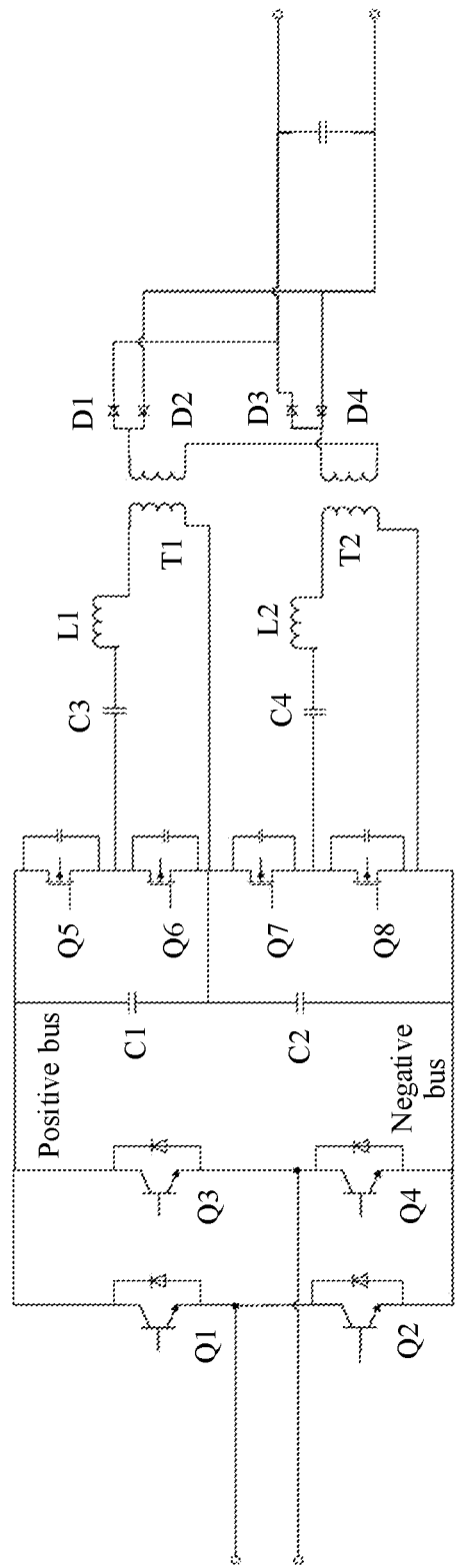
FIG. 4 is a circuit diagram of a power conversion module according to an embodiment of this application.

FIG. 4 is a circuit diagram of a single power conversion module in the power electronic transformer provided in this embodiment of this application.

The AC/DC circuit in the power electronic transformer provided in this embodiment has a plurality of implementations. No limitation is posed in the following embodiments. The AC/DC circuit may use a rectifier that can implement a rectification function, for example, may use any one of the following: a two-level full-bridge rectifier, an I-type three-level rectifier, and a T-type three-level rectifier.

This embodiment provides illustrative description by using an example in which the AC/DC circuit is a two-level full-bridge rectifier. As shown in FIG. 4, semiconductor switching components Q1 to Q4 form a two-level full-bridge rectifier, which is configured to rectify an alternating current into a direct current and provide the direct current to the corresponding DC/DC circuit. In this embodiment of this application, a type of the semiconductor switching components is not limited. The semiconductor switching components are uniformly referred to as switching transistors for short in the following.

A first direct current bus capacitor C1 and a second direct current bus capacitor C2 are connected between a positive output end and a negative output end of the two-level full-bridge rectifier that includes Q1 to Q4. Capacitors C1 and C2 are connected in series and then connected between a positive bus and a negative bus. The AC/DC circuit outputs a direct current. Therefore, the positive bus is a direct current positive bus, and the negative bus is a direct current negative bus.

As an example for description in FIG. 4, one LLC resonant DC/DC unit corresponds to one direct current bus capacitor.

In this embodiment of this application, a quantity of direct current bus capacitors included in each power conversion module is not limited. The quantity of direct current bus capacitors may be the same as the quantity of LLC resonant DC/DC units. In other words, each LLC resonant DC/DC unit corresponds to one direct current bus capacitor. For example, each power conversion module includes n direct current bus capacitors. All the direct current bus capacitors are connected in series and then connected in parallel between a direct current positive bus and a direct current negative bus of the output end of the AC/DC circuit. Each LLC resonant DC/DC unit corresponds to one direct current bus capacitor. A positive input end and a negative input end of each LLC resonant DC/DC unit are respectively connected to two ends of the corresponding direct current bus capacitor. Alternatively, the quantity of direct current bus capacitors may be an integer multiple of the quantity of LLC resonant DC/DC units. For example, one LLC resonant DC/DC unit corresponds to two direct current bus capacitors. In this embodiment of this application, a capacitance of a capacitor is not limited. Generally, capacitances of all the direct current bus capacitors are equal, so that input voltages of the LLC resonant DC/DC units corresponding to the direct current bus capacitors are equal.

A first LLC resonant DC/DC unit corresponds to the direct current bus capacitor C1, and an input end of the first LLC resonant DC/DC unit is connected to two ends of the direct current bus capacitor C1. A second LLC resonant DC/DC unit corresponds to the direct current bus capacitor C2, and an input end of the second LLC resonant DC/DC unit is connected to two ends of the direct current bus capacitor C2.

The first LLC resonant DC/DC unit includes a first switching transistor Q5 and a second switching transistor Q6, a first capacitor C3, a first inductor L1, a first transformer T1, and a first diode D1 and a second diode D2.

The second LLC resonant DC/DC unit includes a third switching transistor Q7 and a fourth switching transistor Q8, a second capacitor C4, a second inductor L2, a second transformer T2, and a third diode D3 and a fourth diode D4.

The LLC resonant DC/DC units in each power conversion module have a same topological structure. For ease of description and ease of understanding by a person skilled in the art, the following provides description by using the first LLC resonant DC/DC unit in this embodiment as an example.

The first switching transistor Q5 and the second switching transistor Q6 are connected in series and then connected to the two ends of the corresponding direct current bus capacitor (C1). A first end of the first switching transistor Q5 is connected to a positive electrode of C1, a second end of the first switching transistor Q5 is connected to a first end of the second switching transistor Q6, and a second end of the second switching transistor Q6 is connected to a negative electrode of C1. A common end of the second switching transistor Q6 is connected to the negative electrode of the corresponding direct current bus capacitor C1 through the first capacitor C3, the first inductor L1, and a primary side of the first transformer T1 that are connected in series.

An anode of the first diode D1 is connected to a positive electrode of a secondary side of the transformer T1, and a cathode of the first diode D1 is connected to a positive output end of the corresponding DC/DC circuit. A cathode of the second diode D2 is connected to the positive electrode of the secondary side of the transformer T1, and an anode of the second diode D2 is connected to a negative output end of the corresponding DC/DC circuit.

Figure 5:
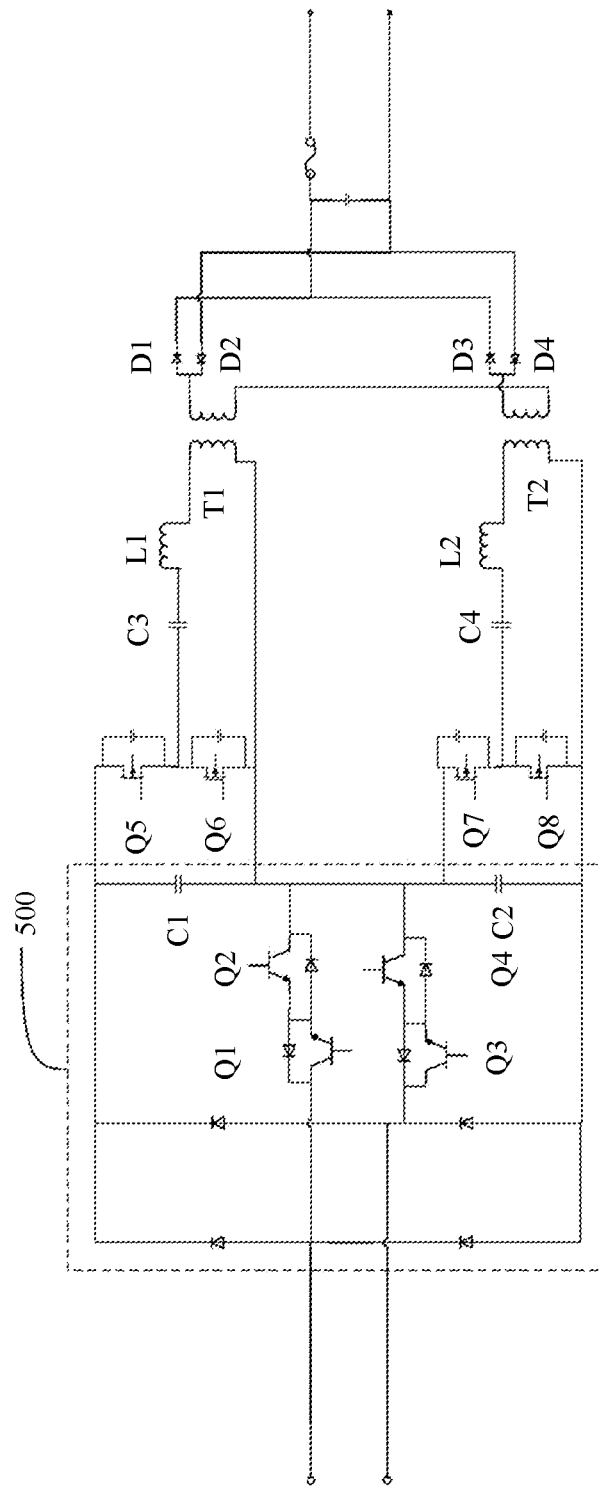
FIG. 5 is a circuit diagram of another power conversion module according to an embodiment of this application.

The AC/DC circuit provided in FIG. 4 is a two-level full-bridge rectifier. The AC/DC circuit may alternatively use another topology. For details, refer to FIG. 5. FIG. 5 is a circuit diagram of a single power conversion module in the power electronic transformer provided in this embodiment of this application.

An AC/DC circuit 500 in FIG. 5 is a T-type three-level rectifier. Parts in FIG. 5 that are the same as those in FIG. 4 are not described herein again.

When the AC/DC circuit uses the T-type three-level rectifier 500, a quantity of LLC resonant DC/DC units in the power conversion module is an even number. In FIG. 5, for example, the quantity of LLC resonant DC/DC units is 2. The quantity may alternatively be other even numbers, which are not illustrated herein one by one.

In the power electronic transformer provided in this embodiment, the DC/DC circuit includes two LLC resonant DC/DC units. The 2n switching transistors are connected in series between a direct current positive bus and a direct current negative bus in the DC/DC circuit, thereby increasing a voltage that a single power conversion module can withstand. For example, Q5 to Q8 each still use a switching transistor with a withstand voltage of 650 V. Then, a corresponding direct current bus voltage that Q5 to Q8 withstand is 800 V. For an input alternating current of 10 kV, each phase of the power electronic transformer needs approximately 13 power conversion modules like the one shown in FIG. 4. A three-phase power electronic transformer includes approximately 39 power conversion modules like the one shown in FIG. 4. A quantity of power conversion modules in the power electronic transformer provided in this embodiment decreases by nearly half compared to the quantity of power conversion modules in FIG. 2.

Therefore, the power electronic transformer provided in this embodiment can decrease a quantity of power conversion modules, thereby reducing design complexity of the entire power electronic transformer, reducing space occupied by a single power electronic transformer, and also reducing costs.

In this embodiment of this application, a type of a switching transistor in an LLC resonant DC/DC unit is not limited. For example, a switching transistor may be a metal-oxide-semiconductor field-effect transistor (MOSFET), or may be an insulated gate bipolar transistor (IGBT).

Embodiment 2 of Power Electronic Transformer

Preferably, a quantity n of LLC resonant DC/DC units is greater than or equal to 3. In this case, a voltage and a current output by a power electronic transformer have better quality. Fewer harmonic waves are included, and a ripple current is lower. A switching frequency of a switching transistor in a DC/DC circuit is higher than a switching frequency of a switching transistor in an AC/DC circuit. Therefore, switching losses of the switching transistor in the DC/DC circuit need to be reduced as far as possible, and soft switching needs to be implemented for the switching transistor in action as far as possible. LLC resonance exists in an LLC resonant DC/DC unit, and resonance can reduce losses. Therefore, a switching transistor in the LLC resonant DC/DC unit approximately implements soft switching, thereby reducing switching losses.

To better cancel a harmonic wave of each LLC resonant DC/DC unit, negative electrodes of secondary sides of transformers in all the LLC resonant DC/DC units may be connected together.

To further reduce ripple currents, a value of n may be an integer multiple of 3. For example, n is 3, 6, 9, or 12. When the value of n is an integer multiple of 3, every three LLC resonant DC/DC units can be one group, and negative electrodes of secondary sides of transformers in the three LLC resonant DC/DC units in each group are connected together.

Connecting the negative electrodes of the secondary sides of the transformers together can reduce switching losses of diodes of the secondary sides and enable the diodes to implement soft switching.

Figure 6:
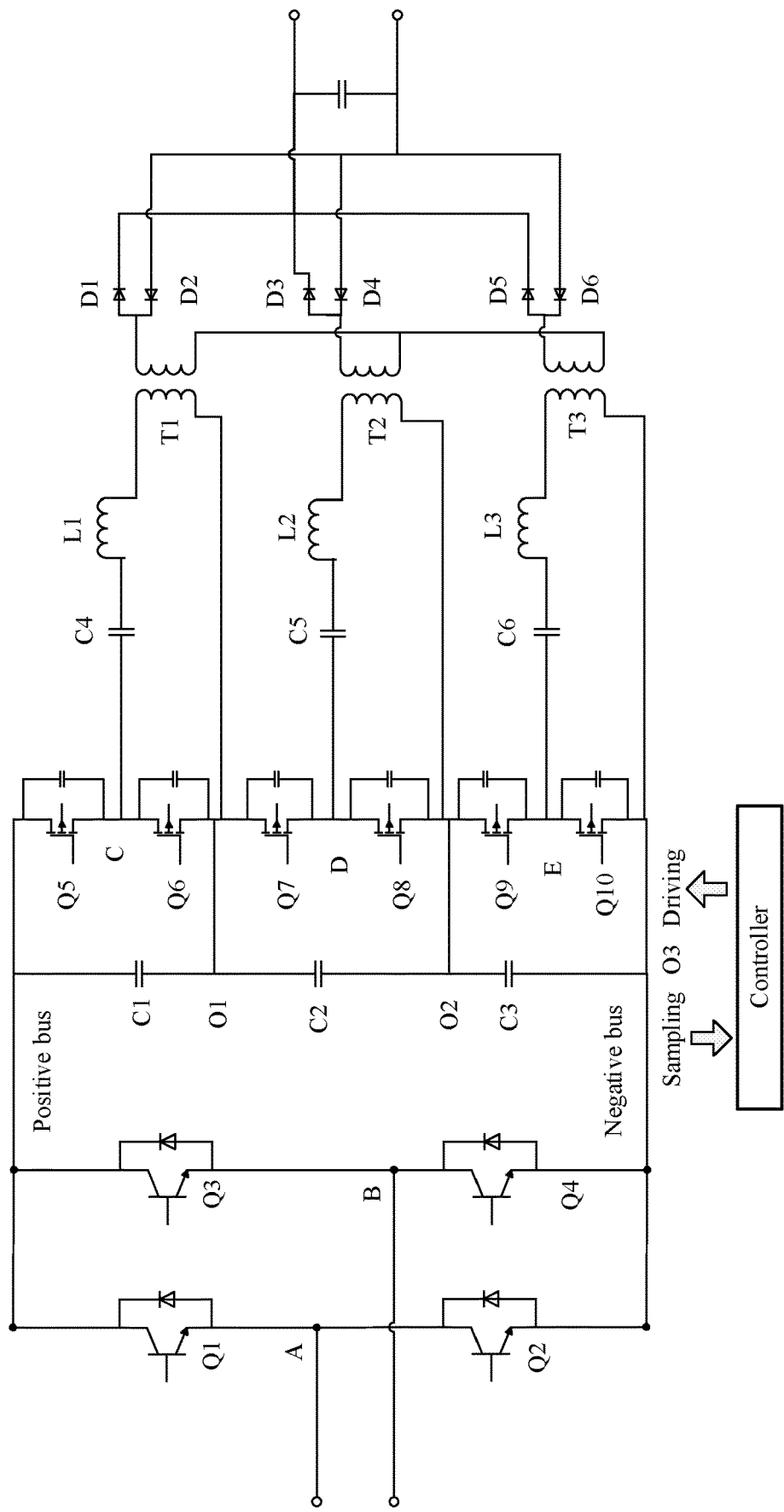
FIG. 6 is a circuit diagram of still another power conversion module according to an embodiment of this application.

For ease of description and ease of understanding by a person skilled in the art, the following provides description by using an example in which a DC/DC circuit in a power conversion module provided in FIG. 6 includes three LLC resonant DC/DC units. Compared with the technical solution in which a DC/DC circuit includes two LLC resonant DC/DC units, this further decreases a total quantity of power conversion modules, thereby further reducing occupied space and costs of the entire power electronic transformer.

FIG. 6 is a circuit diagram of a single power conversion module in the power electronic transformer provided in this embodiment of this application.

This embodiment provides illustrative description still by using an example in which an AC/DC circuit is a two-level full-bridge rectifier.

An AC/DC circuit in each power conversion module includes a two-level full-bridge rectifier formed by switching transistors Q1 to Q4.

A quantity of direct current bus capacitors is the same as a quantity of LLC resonant DC/DC units. Three direct current bus capacitors are also included, which are respectively a first direct current bus capacitor C1, a second direct current bus capacitor C2, and a third direct current bus capacitor C3. C1, C2, and C3 are connected in series and then connected between a direct current positive bus and a direct current negative bus.

A first LLC resonant DC/DC unit includes a first switching transistor Q5 and a second switching transistor Q6, a first capacitor C4, a first inductor L1, a first transformer T1, and a first diode D1 and a second diode D2.

A second LLC resonant DC/DC unit includes a third switching transistor Q7 and a fourth switching transistor Q8, a second capacitor C5, a second inductor L2, a second transformer T2, and a third diode D3 and a fourth diode D4.

A third LLC resonant DC/DC unit includes a fifth switching transistor Q9 and a sixth switching transistor Q10, a third capacitor C6, a third inductor L3, a third transformer T3, and a fifth diode D5 and a sixth diode D6.

An input end of the first LLC resonant DC/DC unit is connected to two ends of the first direct current bus capacitor C1, an input end of the second LLC resonant DC/DC unit is connected to two ends of the second direct current bus capacitor C2, and an input end of the third LLC resonant DC/DC unit is connected to two ends of the third direct current bus capacitor C3.

Negative electrodes of secondary sides of the transformers in the first LLC resonant DC/DC unit, the second LLC resonant DC/DC unit, and the third LLC resonant DC/DC unit are connected together; and output ends of the first LLC resonant DC/DC unit, the second LLC resonant DC/DC unit, and the third LLC resonant DC/DC unit are connected in parallel.

In an implementation, the direct current bus capacitors C1, C2, and C3 in FIG. 6 all have a same capacitance. The n direct current bus capacitors are connected in series, and capacitor components are different from each other. Therefore, voltages between a plurality of capacitors may be unbalanced, causing a circuit to get out of control. Usually, a balanced circuit needs to be added for the direct current bus capacitors that are connected in series. However, adding the balanced circuit causes space and costs of the power electronic transformer to increase.

Therefore, the power electronic transformer provided in this embodiment of this application further includes a voltage sampling circuit and a controller. This can also implement voltage balancing between the plurality of capacitors without a need to set a balanced circuit for the direct current bus capacitors, thereby further reducing occupied space and costs of the entire power electronic transformer.

The following describes this embodiment provided in this application in detail with reference to accompanying drawings.

The voltage sampling circuit is configured to collect voltages on the three direct current bus capacitors C1, C2, and C3.

The controller is configured to: compare the voltages on the three direct current bus capacitors C1, C2, and C3 with a preset voltage; and when a voltage on an $i^{th}$ direct current bus capacitor is greater than the preset voltage, control a switching frequency of a switching transistor in an LLC resonant DC/DC unit corresponding to the $i^{th}$ direct current bus capacitor to decrease, so as to decrease the voltage on the $i^{th}$ direct current bus capacitor; or when a voltage on an $i^{th}$ direct current bus capacitor is less than the preset voltage, control a switching frequency of a switching transistor in an LLC resonant DC/DC unit corresponding to the $i^{th}$ direct current bus capacitor to increase, so as to increase the voltage on the $i^{th}$ direct current bus capacitor, where i 32 1, . . . , and n.

A value of the preset voltage is not limited in this embodiment of this application. A person skilled in the art can select a value of the preset voltage based on an actual need. For example, the preset voltage may be an average voltage value of all the direct current bus capacitors.

For ease of description and ease of understanding by a person skilled in the art, the following describes an operating principle of the controller by using an example in which the preset voltage is the average voltage value of all the direct current bus capacitors.

When the controller determines that the voltage on C1 is greater than the average voltage value, that is, Vc1>(Vc1+Vc2+Vc3)/3, switching frequencies of Q5 and Q6 in the LLC resonant DC/DC unit corresponding to C1 are decreased and an output voltage of C1 is increased, to increase output energy of C1, thereby decreasing the voltage on C1 and achieving a voltage balancing effect.

Similarly, when the controller determines that the voltage on C1 is less than the average voltage value, that is, Vc1<(Vc1+Vc2+Vc3)/3, switching frequencies of Q5 and Q6 in the LLC resonant DC/DC unit corresponding to C1 are increased and an output voltage of C1 is decreased, to decrease output energy of C1, thereby increasing the voltage on C1 and achieving a voltage balancing effect.

The power electronic transformer provided in this embodiment includes the voltage sampling circuit and the controller. The voltage sampling circuit collects the voltages on all the direct current bus capacitors, and the controller compares the voltage on each direct current bus capacitor with the preset voltage. When a voltage on a direct current bus capacitor is not equal to the preset voltage, the controller controls a switching frequency of a switching transistor in an LLC resonant DC/DC unit corresponding to the direct current bus capacitor to change, to adjust the voltage on the direct current bus capacitor. In this way, a problem that voltages on the direct current bus capacitors are unbalanced caused by a component difference between the direct current bus capacitors can also be overcome without a need to set a balanced circuit for the direct current bus capacitors, thereby implementing automatic voltage balancing for the direct current bus capacitors, and further reducing occupied space and costs of a single power electronic transformer.

Figure 7:
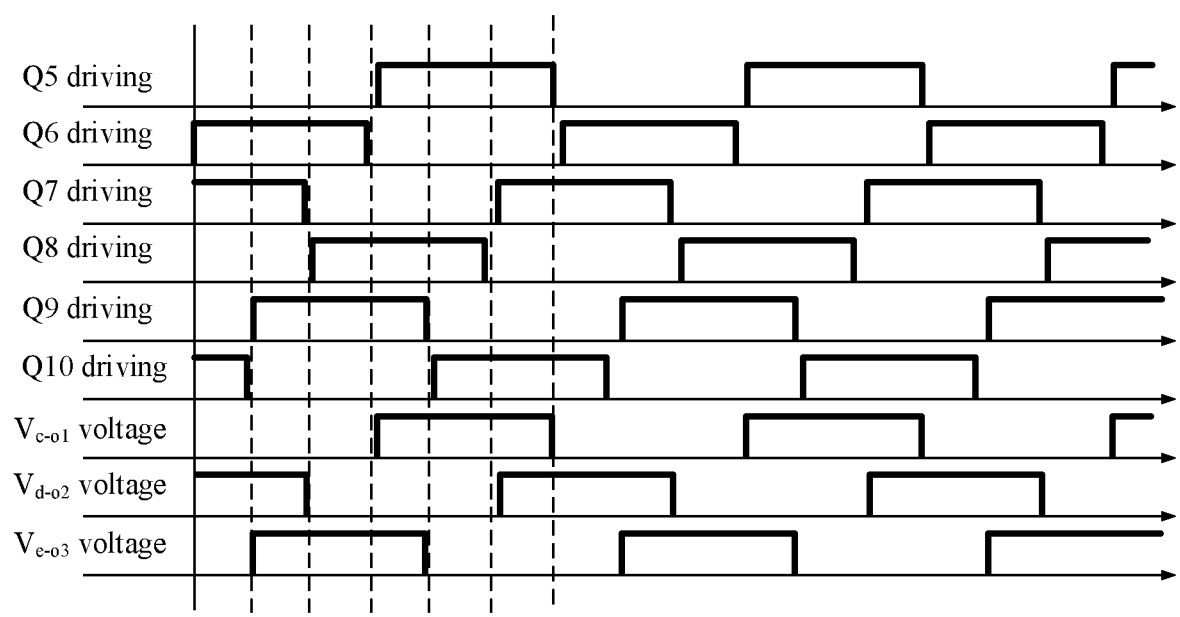
FIG. 7 is a diagram of wave transmission logic of a DC/DC circuit according to an embodiment of this application.

The following describes a driving mode of an LLC resonant DC/DC unit. FIG. 7 is a diagram of logic of driving pulse signals of switching transistors in a DC/DC circuit provided in this embodiment of this application.

In each LLC resonant DC/DC unit, a first driving pulse signal of a first switching transistor and a second driving pulse signal of a second switching transistor are complementary to each other, and the first driving pulse signal and the second driving pulse signal have a same cycle and both have a duty cycle of 50%. As shown in FIG. 7, driving pulse signals of Q5 and Q6 are complementary to each other, driving pulse signals of Q7 and Q8 are complementary to each other, and driving pulse signals of Q9 and Q10 are complementary to each other. In other words, when Q5 is turned on, Q6 is turned off; when Q7 is turned on, Q8 is turned off; and when Q9 is turned on, Q10 is turned off In an implementation, phases of driving pulse signals corresponding to the LLC resonant DC/DC units are offset by T/n in sequence, where T represents a cycle of the driving pulse signals. For example, when n is 2, the phases are offset by 180 degrees in sequence. When n is 3, the phases are offset by 120 degrees in sequence.

The driving pulse signal of the first switching transistor Q5 and the driving pulse signal of the second switching transistor Q6 are complementary to each other and both have a duty cycle of 50%. The driving pulse signal of the third switching transistor Q7 and the driving pulse signal of the fourth switching transistor Q8 are complementary to each other and both have a duty cycle of 50%. The driving pulse signal of the fifth switching transistor Q9 and the driving pulse signal of the sixth switching transistor Q10 are complementary to each other and both have a duty cycle of 50%.

If a switching cycle of a driving pulse signal is T, phases of the driving pulse signal of the switching transistor Q5 in the first LLC resonant DC/DC unit, the driving pulse signal of the switching transistor Q7 in the second LLC resonant DC/DC unit, and the driving pulse signal of the switching transistor Q9 in the third LLC resonant DC/DC unit are offset by 120 degrees in sequence. Similarly, phases of the driving pulse signal of the switching transistor Q6 in the first LLC resonant DC/DC unit, the driving pulse signal of the switching transistor Q8 in the second LLC resonant DC/DC unit, and the driving pulse signal of the switching transistor Q10 in the third LLC resonant DC/DC unit are offset by 120 degrees in sequence.

In FIG. 6, a point C is a common end of Q5 and Q6, a point D is a common end of Q7 and Q8, and a point E is a common end of Q9 and Q10. O1 is a common end of C1 and C2, and O2 is a common end of C2 and C3.

A voltage between the point C and O1 is $V_{c\text{-}O1}$. Similarly, a voltage between the point D and O2 is $V_{d\text{-}o2}$, and a voltage between the point E and O3 is $V_{e\text{-}o3}$. As shown in FIG. 7, phases of $V_{c\text{-}o1}$, $V_{d\text{-}o2}$, and $V_{e\text{-}o3}$ are offset by T/3 in sequence. For example, phases of $V_{c\text{-}o1}$ and $V_{d\text{-}o2}$ are offset by 120 degrees, and phases of $V_{d\text{-}o2}$ and $V_{e\text{-}o3}$ are offset by 120 degrees.

In addition, the three LLC resonant DC/DC units have a same structure. Therefore, phases of primary-side currents of the transformers T1, T2, and T3 are also offset by T/3. Parameters of the transformers are the same. Therefore, phases of secondary-side currents of the transformers T1, T2, and T3 are also offset by T/3. When there is a load at an output end of the power electronic transformer, both a positive current and a negative current exist in the secondary-side currents of the transformers T1, T2, and T3 at any moment. Therefore, the secondary sides of the transformers T1, T2, and T3 can connect negative electrodes of the three transformers together, as shown in FIG. 6.

In the power electronic transformer provided in this embodiment, the DC/DC circuit includes three LLC resonant DC/DC units. In other words, a quantity of switching transistors connected in series between a positive bus and a negative bus in the DC/DC circuit is increased. Compared with the technical solution in which a DC/DC circuit includes two LLC resonant DC/DC units, a power conversion module can withstand a higher voltage. For example, Q5 to Q10 each still use a switching transistor with a withstand voltage of 650 V. Then, a corresponding bus voltage that Q5 to Q10 withstand is 1200 V. For an input alternating current of 10 kV, each phase of the power electronic transformer needs approximately nine power conversion modules like the one shown in FIG. 6. A three-phase power electronic transformer includes approximately 27 power conversion modules like the one shown in FIG. 6. A quantity of power conversion modules in the power electronic transformer provided in this embodiment continues to decrease by nearly one third compared to the quantity of power conversion modules in FIG. 4.

Therefore, the power electronic transformer provided in this embodiment can further decrease a quantity of power conversion modules, thereby reducing design complexity of the entire power electronic transformer, reducing space occupied by a single power electronic transformer, and also reducing costs.

Embodiment 3 of Power Electronic Transformer

A power electronic transformer provided in this embodiment of this application is described by using an example in which a DC/DC circuit in a power conversion module includes six LLC resonant DC/DC units. Compared with the technical solution in which a DC/DC circuit includes two LLC resonant DC/DC units or three LLC resonant DC/DC units, this further decreases a total quantity of power conversion modules in the power electronic transformer, thereby further reducing occupied space and costs of the entire power electronic transformer.

The following describes this embodiment provided in this application in detail with reference to accompanying drawings.

Figure 8:
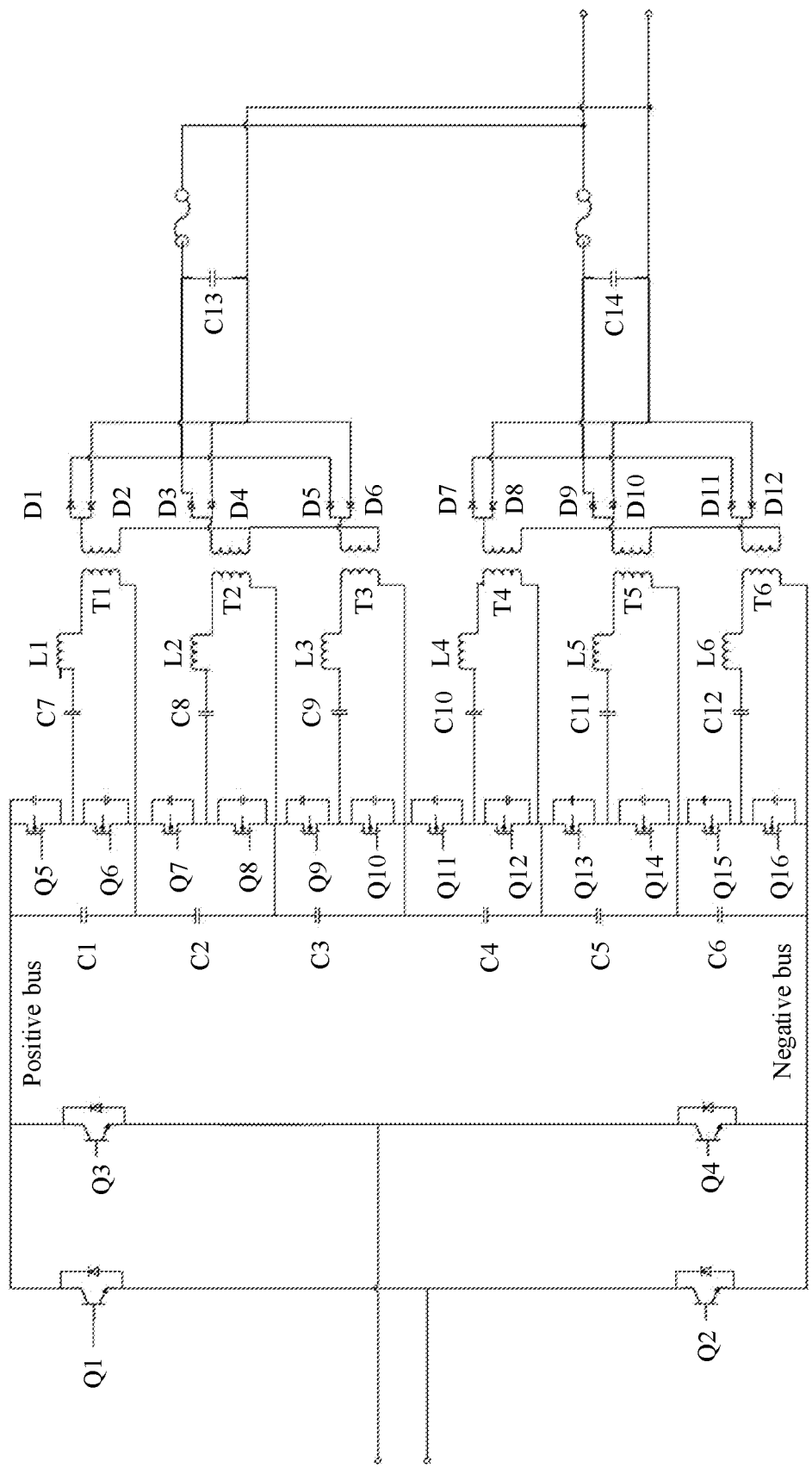
FIG. 8 is a circuit diagram of yet another power conversion module according to an embodiment of this application.

FIG. 8 shows a circuit of a single power conversion module in the power electronic transformer provided in this embodiment of this application.

This embodiment provides illustrative description still by using an example in which an AC/DC circuit is a two-level full-bridge rectifier. As shown in FIGS. 8, Q1 to Q4 form a two-level full-bridge rectifier.

In this embodiment, a quantity of LLC resonant DC/DC units is the same as a quantity of direct current bus capacitors. Six LLC resonant DC/DC units correspond to the following six direct current bus capacitors, which are respectively a first direct current bus capacitor C1, a second direct current bus capacitor C2, a third direct current bus capacitor C3, a fourth direct current bus capacitor C4, a fifth direct current bus capacitor C5, and a sixth direct current bus capacitor C6. C1 to C6 are connected in series and then connected between a direct current positive bus and a direct current negative bus.

A first LLC resonant DC/DC unit includes a first switching transistor Q5 and a second switching transistor Q6, a first capacitor C7, a first inductor L1, a first transformer T1, and a first diode D1 and a second diode D2.

A second LLC resonant DC/DC unit includes a third switching transistor Q7 and a fourth switching transistor Q8, a second capacitor C8, a second inductor L2, a second transformer T2, and a third diode D3 and a fourth diode D4.

A third LLC resonant DC/DC unit includes a fifth switching transistor Q9 and a sixth switching transistor Q10, a third capacitor C9, a third inductor L3, a third transformer T3, and a fifth diode D5 and a sixth diode D6.

A fourth LLC resonant DC/DC unit includes a seventh switching transistor Q11 and an eighth switching transistor Q12, a fourth capacitor C10, a fourth inductor L4, a fourth transformer T4, and a seventh diode D7 and an eighth diode D8.

A fifth LLC resonant DC/DC unit includes a ninth switching transistor Q13 and a tenth switching transistor Q14, a fifth capacitor C11, a fifth inductor L5, a fifth transformer T5, and a ninth diode D9 and a tenth diode D10.

A sixth LLC resonant DC/DC unit includes an eleventh switching transistor Q15 and a twelfth switching transistor Q16, a sixth capacitor C12, a sixth inductor L6, a sixth transformer T6, and an eleventh diode D11 and a twelfth diode D12.

An input end of the first LLC resonant DC/DC unit is connected to two ends of the first direct current bus capacitor C1, an input end of the second LLC resonant DC/DC unit is connected to two ends of the second direct current bus capacitor C2, an input end of the third LLC resonant DC/DC unit is connected to two ends of the third direct current bus capacitor C3, an input end of the fourth LLC resonant DC/DC unit is connected to two ends of the fourth direct current bus capacitor C4, an input end of the fifth LLC resonant DC/DC unit is connected to two ends of the fifth direct current bus capacitor C5, and an input end of the sixth LLC resonant DC/DC unit is connected to two ends of the sixth direct current bus capacitor C6.

Negative electrodes of secondary sides of the transformers in the first LLC resonant DC/DC unit, the second LLC resonant DC/DC unit, and the third LLC resonant DC/DC unit are connected together; and negative electrodes of secondary sides of the transformers in the fourth LLC resonant DC/DC unit, the fifth LLC resonant DC/DC unit, and the sixth LLC resonant DC/DC unit are connected together. Output ends of the foregoing six LLC resonant DC/DC units are connected in parallel in an interleaved manner.

In an implementation, the power electronic transformer further includes a filter capacitor. Every three LLC resonant DC/DC units are one group and correspond to one filter capacitor, and the filter capacitor is connected in parallel to an output end of each group. For example, as shown in FIG. 8, the first LLC resonant DC/DC unit, the second LLC resonant DC/DC unit, and the third LLC resonant DC/DC unit are one group and correspond to a filter capacitor C13, and the filter capacitor C13 is connected in parallel to an output end of the group. Similarly, the fourth LLC resonant DC/DC unit, the fifth LLC resonant DC/DC unit, and the sixth LLC resonant DC/DC unit are one group and correspond to a filter capacitor C14, and the filter capacitor C14 is connected in parallel to an output end of the group.

Figure 9:
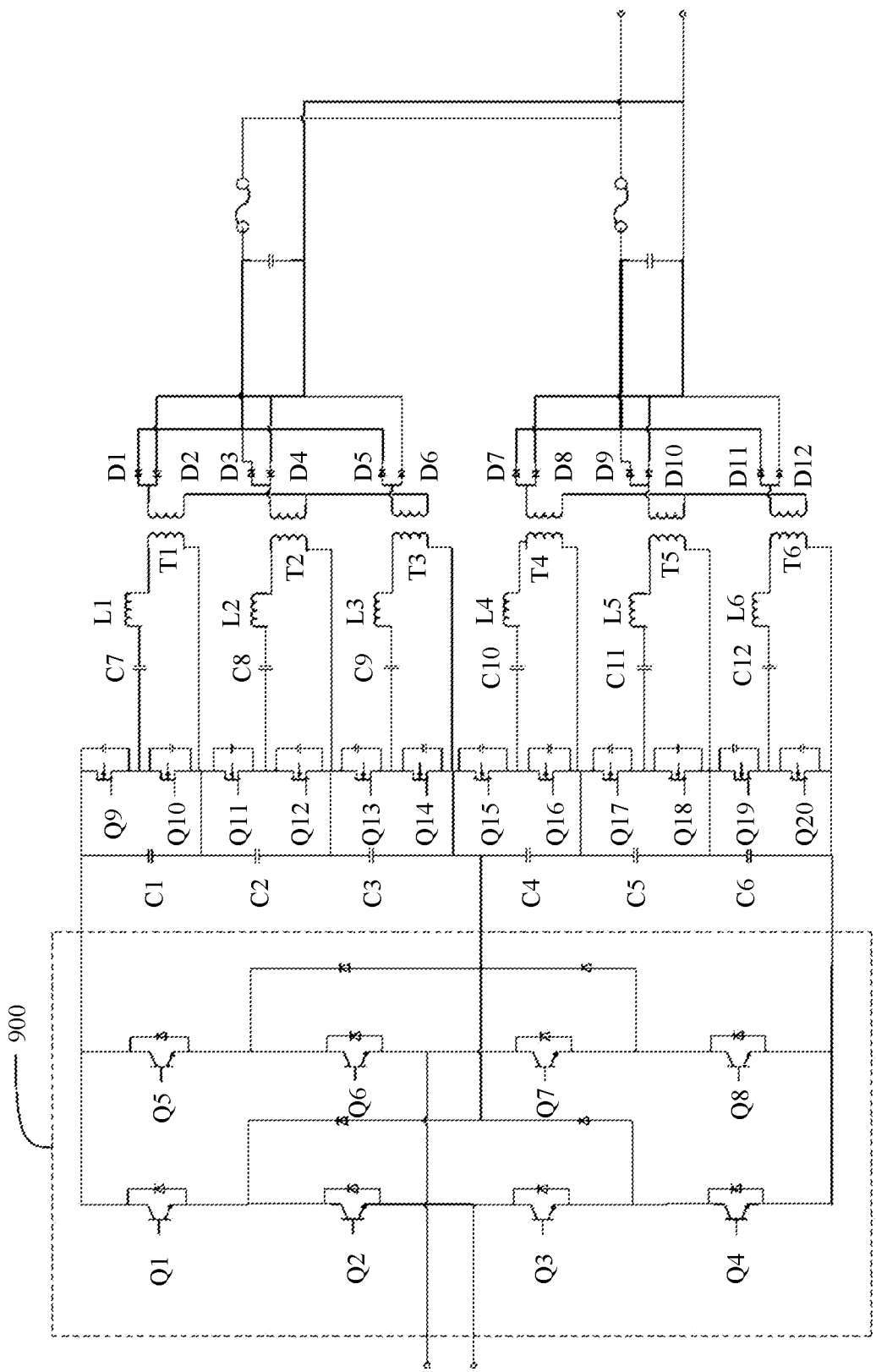
FIG. 9 is a circuit diagram of still yet another power conversion module according to an embodiment of this application.

In an implementation, an AC/DC circuit in a power conversion module may alternatively use an AC/DC circuit in another topology. For details, refer to FIG. 9. FIG. 9 is a circuit diagram of a single power conversion module in the power electronic transformer provided in this embodiment of this application.

For ease of description and understanding, this embodiment describes only a difference of FIG. 9 from FIG. 8. In FIG. 9, an AC/DC circuit 900 is an I-type three-level rectifier. Parts in FIG. 9 that are the same as those in FIG. 8 are not described herein again.

In the power electronic transformer provided in this embodiment, the DC/DC circuit includes six LLC resonant DC/DC units. In other words, a quantity of switching transistors connected in series between a positive bus and a negative bus in the DC/DC circuit is further increased. Compared with the technical solution in which a DC/DC circuit includes three LLC resonant DC/DC units, a voltage that a power conversion module can withstand continues to increase. For example, the 12 switching transistors in the DC/DC circuit each still use a switching transistor with a withstand voltage of 650 V. Then, a corresponding bus voltage that the switching transistors withstand is 2400 V.

For an input alternating current of 10 kV, each phase of the power electronic transformer needs approximately five power conversion modules like the one shown in FIG. 8 or FIG. 9. A three-phase power electronic transformer includes approximately 15 power conversion modules like the one shown in FIG. 6 or FIG. 7. A quantity of power conversion modules in the power electronic transformer provided in this embodiment continues to decrease by nearly ½ compared to the quantity of power conversion modules in FIG. 3.

Therefore, a single power conversion module can withstand a higher voltage when there is a larger quantity of switching transistors in the LLC resonant DC/DC units; and when an input voltage of the power electronic transformer is definite, fewer power conversion modules are needed. This can further decrease a quantity of power conversion modules, thereby further reducing design complexity of the entire power electronic transformer, reducing space occupied by a single power electronic transformer, and also reducing costs.

System Embodiment

Based on a power electronic transformer provided in the foregoing embodiments, this embodiment of this application further provides a power supply system, which is described in detail in the following with reference to accompanying drawings.

Figure 10:
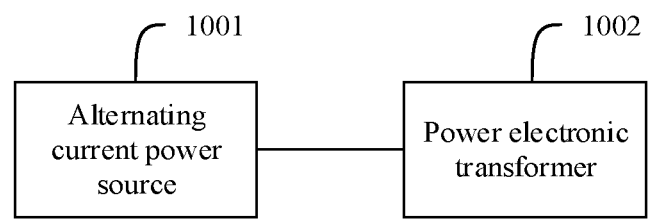
FIG. 10 is a diagram of a power supply system according to an embodiment of this application.

FIG. 10 is a diagram of the power supply system provided in this embodiment of this application.

The power supply system provided in this embodiment includes an alternating current power source 1001 and any power electronic transformer 1002 provided in the foregoing embodiments.

An input end of the power electronic transformer 1002 is connected to the alternating current power source 1001, and the power electronic transformer 1002 is configured to transform and then output a voltage of the alternating current power source 1001.

The alternating current power source 1001 may be a single-phase power source, or may be a three-phase power source.

When the alternating current power source 1001 is a single-phase power source, the power electronic transformer 1002 is a single-phase power electronic transformer.

When the alternating current power source 1001 is a three-phase power source, the power electronic transformer 1002 is a three-phase power electronic transformer.

In all the foregoing embodiments, the power electronic transformer is described by using an example in which a current power source is a three-phase power source. When the alternating current power source is a single-phase power source, a single-phase power electronic transformer that includes power conversion modules described in the foregoing embodiments is used. Principles thereof are similar. Details are not described herein again.

The power supply system provided in this embodiment includes the power electronic transformer provided in any one of the foregoing embodiments, and a DC/DC circuit in a power conversion module in the power electronic transformer includes at least two LLC resonant DC/DC units. An input end of each LLC resonant DC/DC unit includes at least two switching transistors that are connected in series, and the input ends of all the LLC resonant DC/DC units are connected in series to two ends of a direct current bus capacitor. Therefore, the two ends of the direct current bus capacitor are connected in parallel to at least 2n switching transistors. A voltage that a single power conversion module can withstand increases as a quantity of switching transistors increases.

When an input voltage of the power electronic transformer is definite, fewer power conversion modules are needed. Therefore, the power electronic transformer in the power supply system can decrease a quantity of internal power conversion modules, thereby reducing design complexity of the power electronic transformer in the power supply system, reducing occupied space, and reducing costs.

It should be understood that, in this application, "at least one (item)" means one or more, and "a plurality of" means two or more. "And/Or" is used to describe an association relationship of associated objects and represents that three relationships may exist. For example, "A and/or B" may represent the following three cases: Only A exists, only B exists, and both A and B exist. A and B may be in a singular or plural form. The character "/" generally indicates an "or" relationship between the associated objects. "At least one (item) of the following" or a similar expression thereof means any combination of these items, including a single item or any combination of a plurality of items. For example, at least one (item) of a, b, or c may represent: a, b, c, "a and b", "a and c", "b and c", or "a and b and c", where there may be one or more items a, one or more items b, and one or more items c.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A power electronic transformer, the power electronic transformer comprising:
   two or more phase power conversion modules coupled to a phase input of the power electronic transform, each phase power conversion module of the two or more phase power conversion modules comprising:
   a rectifier AC/DC circuit, the rectifier AC/DC circuit including AC/DC input ends and AC/DC output ends;
   a direct current bus capacitor coupled across the AC/DC output ends; and
   a DC/DC circuit coupled to the AC/DC output ends and the direct current bus capacitor, the DC/DC circuit including DC/DC output ends, the DC/DC circuit comprising:
   n number of LLC resonant DC/DC units, n comprising an integer greater than or equal to 2, the n number of LLC resonant DC/DC units including n number of LLC input ends and n number of LLC output ends, the n number of LLC input ends being coupled to the AC/DC output ends, and the n number of LLC output ends being connected in parallel and forming the DC/DC output ends of the DC/DC circuit;
   two or more AC/DC input ends of the two or more phase power conversion modules of the phase input being connected in series;
   two or more DC/DC output ends of the two or more phase power conversion modules of the phase input being connected in parallel and forming a phase output;

a voltage sampling circuit configured to collect a voltage on each direct current bus capacitor of the n direct current bus capacitors; and a controller in communication with the voltage sampling circuit, the controller is configured to:
  compare the voltage on each direct current bus capacitor with a preset voltage; and
  when a voltage on an $i^{th}$ direct current bus capacitor is greater than the preset voltage, control a switching frequency of a switching transistor in an LLC resonant DC/DC unit corresponding to the $i^{th}$ direct current bus capacitor to decrease the voltage on the $i^{th}$ direct current bus capacitor; or when the voltage on the $i^{th}$ direct current bus capacitor is less than the preset voltage, control the switching frequency of the switching transistor in the LLC resonant DC/DC unit corresponding to the $i^{th}$ direct current bus capacitor to increase the voltage on the $i^{th}$ direct current bus capacitor, wherein i=1, . . . , and n.

2. The power electronic transformer according to claim 1, wherein each phase power conversion module of the two or more phase power conversion modules comprises:
  n direct current bus capacitors, the n direct current bus capacitors being connected in series, and connected in parallel across a direct current positive bus and a direct current negative bus of the AC/DC circuit output ends;
  each LLC resonant DC/DC unit of the n number of LLC resonant DC/DC units corresponds to one direct current bus capacitor of the n direct current bus capacitors; and
  a LLC input end of a LLC resonant DC/DC unit is connected to two ends of a corresponding direct current bus capacitor.

3. The power electronic transformer according to claim 2, wherein the each LLC resonant DC/DC unit of the n number of LLC resonant DC/DC units comprises a first switching transistor, a second switching transistor, a direct current bus capacitor, an inductor, a transformer, a first diode, and a second diode;
  the first switching transistor and the second switching transistor are connected in series and are further connected across the corresponding direct current bus capacitor;
  common ends of the first switching transistor and the second switching transistor are coupled to a negative electrode of the corresponding direct current bus capacitor through the inductor and a primary side of the transformer, the inductor and the primary side of the transformer being connected in series;
  an anode of the first diode is connected to a first electrode of a secondary side of the transformer, and a cathode of the first diode is connected to a DC/DC circuit positive output end of the corresponding DC/DC circuit; and
  a cathode of the second diode is connected to the first electrode of the secondary side of the transformer, and an anode of the second diode is connected to a negative output end of the corresponding DC/DC circuit.

4. The power electronic transformer according to claim 3, wherein in the each LLC resonant DC/DC unit, a first driving pulse signal of the first switching transistor and a second driving pulse signal of the second switching transistor are complementary to each other, and the first driving pulse signal and the second driving pulse signal have a same cycle and both have a duty cycle of 50%.

5. The power electronic transformer according to claim 4, wherein phases of driving pulse signals corresponding to the LLC resonant DC/DC units are offset by T/n in sequence, wherein T represents a cycle of the driving pulse signals.

6. The power electronic transformer according to claim 3, wherein phases of driving pulse signals corresponding to the LLC resonant DC/DC units are offset by T/n in sequence, wherein T represents a cycle of the driving pulse signals.

7. The power electronic transformer according to claim 2, wherein phases of driving pulse signals corresponding to the LLC resonant DC/DC units are offset by T/n in sequence, wherein T represents a cycle of the driving pulse signals.

8. The power electronic transformer according to claim 2, wherein the n direct current bus capacitors have a same capacitance.

9. The power electronic transformer according to claim 1, wherein phases of driving pulse signals corresponding to the LLC resonant DC/DC units are offset by T/n in sequence, wherein T represents a cycle of the driving pulse signals.

10. The power electronic transformer according to claim 9, wherein n is greater than or equal to 3; and
  the second electrodes of the secondary sides of the transformers in the LLC resonant DC/DC units are connected together.

11. The power electronic transformer according to claim 9, wherein n is an integer multiple of 3; and
  every three LLC resonant DC/DC circuits are one DC/DC group, and second electrodes of secondary sides of three transformers in the three LLC resonant DC/DC circuits in each DC/DC group are connected together.

12. The power electronic transformer according to claim 11, wherein when n is 3, each DC/DC circuit comprises a first LLC resonant DC/DC unit, a second LLC resonant DC/DC unit, and a third LLC resonant DC/DC unit; and
  the direct current bus capacitor comprises a first direct current bus capacitor, a second direct current bus capacitor, and a third direct current bus capacitor;
  an input end of the first LLC resonant DC/DC unit is connected across the first direct current bus capacitor, an input end of the second LLC resonant DC/DC unit is connected across the second direct current bus capacitor, and an input end of the third LLC resonant DC/DC unit is connected across the third direct current bus capacitor; and
  second electrodes of secondary sides of the three transformers in the first LLC resonant DC/DC unit, the second LLC resonant DC/DC unit, and the third LLC resonant DC/DC unit are connected together; and output ends of the first LLC resonant DC/DC unit, the second LLC resonant DC/DC unit, and the third LLC resonant DC/DC unit are connected in parallel.

13. The power electronic transformer according to claim 11, wherein when n is 6, each DC/DC circuit comprises:
  a first LLC resonant DC/DC unit, a second LLC resonant DC/DC unit, a third LLC resonant DC/DC unit, a fourth LLC resonant DC/DC unit, a fifth LLC resonant DC/DC unit, and a sixth LLC resonant DC/DC unit; and
  the direct current bus capacitor comprises a first direct current bus capacitor, a second direct current bus capacitor, a third direct current bus capacitor, a fourth direct current bus capacitor, a fifth direct current bus capacitor, and a sixth direct current bus capacitor;
  first LLC input ends of the first LLC resonant DC/DC unit are connected across the first direct current bus capacitor, second LLC input ends of the second LLC resonant DC/DC unit are connected across the second direct current bus capacitor, third LLC input ends of the third LLC resonant DC/DC unit are connected across the third direct current bus capacitor, fourth LLC input ends of the fourth LLC resonant DC/DC unit are connected across the fourth direct current bus capacitor, fifth LLC input ends of the fifth LLC resonant DC/DC unit are connected across the fifth direct current bus capacitor, and sixth LLC input ends of the sixth LLC resonant DC/DC unit are connected across the sixth direct current bus capacitor;

second electrodes of the secondary sides of the three transformers in the first LLC resonant DC/DC unit, the second LLC resonant DC/DC unit, and the third LLC resonant DC/DC unit are connected together; and second electrodes of the secondary sides of the transformers in the fourth LLC resonant DC/DC unit, the fifth LLC resonant DC/DC unit, and the sixth LLC resonant DC/DC unit are connected together; and LLC output ends of the first LLC resonant DC/DC unit, the second LLC resonant DC/DC unit, the third LLC resonant DC/DC unit, the fourth LLC resonant DC/DC unit, the fifth LLC resonant DC/DC unit, and the sixth LLC resonant DC/DC unit are connected in parallel.

14. The power electronic transformer according to claim 11, further comprising a filter capacitor, wherein'
each DC/DC group corresponds to one filter capacitor, and the filter capacitor is connected in parallel to an output end of the DC/DC group.

15. The power electronic transformer according to claim 1, wherein a phase of the phase input further comprises a filter inductor, wherein:
the filter inductor is connected in series between an alternating current power source and a power conversion module.

16. The power electronic transformer according to claim 1, wherein the AC/DC circuit is any one of the following:
a two-level full-bridge rectifier, an I-type three-level rectifier, or a T-type three-level rectifier.

17. The power electronic transformer according to claim 1, wherein the power electronic transformer is a single-phase power electronic transformer including a single phase input.

18. The power electronic transformer according to claim 1, wherein the power electronic transformer is a three-phase power electronic transformer including three phase inputs.

* * * * *